United States Patent
Shaw et al.

(10) Patent No.: US 8,414,788 B2
(45) Date of Patent: Apr. 9, 2013

(54) REVERSE ACTING RUPTURE DISC WITH LASER-DEFINED ELECTROPOLISHED LINE OF WEAKNESS AND METHOD OF FORMING THE LINE OF WEAKNESS

(75) Inventors: Bon F. Shaw, Blue Springs, MO (US); Bradford T. Stilwell, Blue Springs, MO (US); Michael D. Krebill, Lee's Summit, MO (US); Brent W. Leonard, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 395 days.

(21) Appl. No.: 12/553,189

(22) Filed: Sep. 3, 2009

(65) Prior Publication Data
US 2010/0006547 A1    Jan. 14, 2010

Related U.S. Application Data

(62) Division of application No. 11/096,466, filed on Apr. 1, 2005, now Pat. No. 7,600,527.

(51) Int. Cl.
*C03C 15/00* (2006.01)
(52) U.S. Cl. .............. 216/48; 216/88; 216/41; 216/44; 216/65
(58) Field of Classification Search .............. 29/890, 29/592, 890.141, 890.12; 220/89.3, 89.2, 220/89.1; 137/68.29, 68.28, 68.26, 68.18
See application file for complete search history.

(56) References Cited

U.S. PATENT DOCUMENTS

| | | | |
|---|---|---|---|
| 2,553,267 A | 5/1951 | Nedoh | |
| 2,656,950 A | 10/1953 | Coffman | |

(Continued)

FOREIGN PATENT DOCUMENTS

| | | | |
|---|---|---|---|
| CA | 2001315 | | 2/1991 |
| CA | 1304650 | * | 7/1992 |

(Continued)

OTHER PUBLICATIONS

Supplemental Search Report for EP Application S.N. 06748702.5, dated Dec. 8, 2010; Inventors: Bon F. Shaw, et al. (12 pgs).

(Continued)

*Primary Examiner* — Duy Deo
*Assistant Examiner* — Erin Bergner
(74) *Attorney, Agent, or Firm* — Hovey Williams LLP

(57) ABSTRACT

A reverse acting rupture disc is provided having a laser defined electropolished line-of-weakness recess, and an improved method of forming an electropolished line-of-weakness recess in a reverse acting rupture disc that assures full opening of the disc upon reversal. A rupture disc blank is pre-bulged, final bulged, and then provided with a layer of resist material. A laser is used to remove at least a portion of the layer of resist material corresponding to a desired line-of-weakness recess in the concave face of the bulged rupture disc. The disc is then subjected to an electropolishing operation to remove metal from the lased area of the rupture disc, thereby forming a lustrous polished line-of-weakness recess in the disc of desired configuration and of a predetermined depth that is related to material thickness. The electropolished line of weakness is defined by spaced opposed channel portions separated by a central raised crown portion wherein the channel portions are of greater depth than the crown portion. The burst/reversal pressure of the disc having an electropolished line-of-weakness recess may be selectively controlled by varying the pre-bulging pressure on the disc.

14 Claims, 7 Drawing Sheets

U.S. PATENT DOCUMENTS

| | | |
|---|---|---|
| 2,716,506 A | 8/1955 | Fike |
| 2,980,286 A | 4/1961 | Coffman |
| 3,109,554 A | 11/1963 | Porter et al. |
| 3,121,509 A | 2/1964 | Porter |
| 3,257,026 A | 6/1966 | Taylor |
| 3,388,601 A | 6/1968 | Ingham |
| 3,415,699 A | 12/1968 | Brown |
| 3,484,817 A | 12/1969 | Wood |
| 3,658,206 A | 4/1972 | Barbier |
| 3,693,691 A | 9/1972 | Summers |
| 3,698,598 A | 10/1972 | Wood et al. |
| 3,704,807 A | 12/1972 | Lidgard |
| 3,722,734 A | 3/1973 | Raidl, Jr. |
| 3,815,534 A | 6/1974 | Kneusel |
| 3,834,580 A | 9/1974 | Ludwig et al. |
| 3,845,879 A | 11/1974 | Derbach et al. |
| 3,872,875 A | 3/1975 | Raidl, Jr. |
| 3,921,556 A | 11/1975 | Wood et al. |
| 4,043,481 A | 8/1977 | Herbst |
| 4,072,160 A | 2/1978 | Hansen |
| 4,079,854 A | 3/1978 | Shaw et al. |
| 4,102,167 A | 7/1978 | Wood et al. |
| 4,119,236 A | 10/1978 | Shaw et al. |
| 4,122,595 A | 10/1978 | Wood et al. |
| 4,139,005 A | 2/1979 | Dickey |
| 4,146,047 A | 3/1979 | Wood et al. |
| 4,158,422 A | 6/1979 | Witten et al. |
| 4,207,913 A | 6/1980 | Fike, Jr. |
| 4,211,334 A | 7/1980 | Witten et al. |
| 4,219,126 A | 8/1980 | Oana |
| 4,232,698 A | 11/1980 | Hosterman et al. |
| 4,236,648 A | 12/1980 | Wood et al. |
| 4,238,310 A * | 12/1980 | Eckler et al. ............. 204/252 |
| 4,269,214 A | 5/1981 | Forsythe et al. |
| 4,270,560 A | 6/1981 | Kearney |
| 4,278,181 A | 7/1981 | Wood et al. |
| 4,301,938 A | 11/1981 | Wood et al. |
| 4,315,575 A | 2/1982 | Schwarz et al. |
| 4,342,988 A | 8/1982 | Thompson et al. |
| 4,347,942 A | 9/1982 | Jernberg et al. |
| 4,385,710 A | 5/1983 | Kurihara et al. |
| 4,394,926 A | 7/1983 | Ou et al. |
| 4,404,982 A | 9/1983 | Ou |
| 4,408,194 A | 10/1983 | Thompson |
| 4,416,388 A | 11/1983 | Mulawski |
| 4,433,791 A | 2/1984 | Mulawski |
| 4,441,350 A | 4/1984 | Short, III et al. |
| 4,458,516 A | 7/1984 | Naumann |
| 4,479,587 A | 10/1984 | Mundt et al. |
| 4,479,603 A | 10/1984 | Finnegan |
| 4,481,850 A | 11/1984 | Allen |
| 4,492,103 A | 1/1985 | Naumann |
| 4,505,289 A | 3/1985 | Wilson |
| 4,512,171 A | 4/1985 | Mozley |
| 4,513,874 A | 4/1985 | Mulawski |
| 4,566,476 A | 1/1986 | Fallon et al. |
| 4,580,691 A | 4/1986 | Hansen |
| 4,597,505 A | 7/1986 | Mozley et al. |
| 4,655,070 A | 4/1987 | Clift |
| 4,669,626 A | 6/1987 | Mozley |
| 4,682,619 A | 7/1987 | Clift et al. |
| 4,759,460 A | 7/1988 | Mozley |
| 4,787,180 A | 11/1988 | Robinson et al. |
| 4,803,136 A | 2/1989 | Bowsky et al. |
| 4,809,729 A | 3/1989 | Muddiman |
| 4,819,823 A | 4/1989 | Kadakia et al. |
| 4,821,909 A | 4/1989 | Hibler et al. |
| 4,838,447 A | 6/1989 | Albracht et al. |
| 4,842,004 A | 6/1989 | Steinman |
| 4,842,965 A | 6/1989 | Urushiwara et al. |
| 4,877,644 A | 10/1989 | Wu et al. |
| 4,913,184 A | 4/1990 | Fallon |
| 4,973,819 A | 11/1990 | Thatcher |
| 4,978,947 A | 12/1990 | Finnegan |
| 5,002,085 A | 3/1991 | Fitzgerald |
| 5,005,722 A | 4/1991 | Short, III et al. |
| 5,022,424 A | 6/1991 | Reynolds et al. |
| 5,047,116 A | 9/1991 | Luthi et al. |
| 5,058,413 A | 10/1991 | Muddiman |
| 5,076,312 A | 12/1991 | Powell |
| 5,080,124 A | 1/1992 | McGregor et al. |
| 5,082,133 A | 1/1992 | Farwell et al. |
| 5,154,202 A | 10/1992 | Hibler, Jr. et al. |
| 5,155,471 A | 10/1992 | Ellis et al. |
| 5,167,337 A | 12/1992 | Short, III et al. |
| 5,197,622 A | 3/1993 | Anderson |
| RE34,308 E | 7/1993 | Thompson |
| 5,246,530 A | 9/1993 | Bugle et al. |
| 5,267,666 A | 12/1993 | Hinrichs et al. |
| 5,291,912 A | 3/1994 | Comeaux |
| 5,368,180 A | 11/1994 | Farwell et al. |
| 5,377,716 A | 1/1995 | Farwell et al. |
| 5,395,718 A * | 3/1995 | Jensen et al. ............. 430/5 |
| 5,411,158 A | 5/1995 | Kays et al. |
| 5,467,886 A | 11/1995 | Hinrichs |
| 5,482,075 A | 1/1996 | Farwell et al. |
| 5,499,649 A | 3/1996 | Tomasko et al. |
| 5,509,556 A | 4/1996 | Balz et al. |
| 5,558,114 A | 9/1996 | Strelow |
| 5,570,803 A | 11/1996 | Farwell |
| 5,612,576 A | 3/1997 | Wilson et al. |
| 5,631,634 A | 5/1997 | Strelow |
| 5,678,307 A | 10/1997 | Farwell |
| 5,883,356 A | 3/1999 | Bauer et al. |
| 5,934,308 A | 8/1999 | Farwell et al. |
| 5,974,851 A | 11/1999 | Farwell et al. |
| 5,996,605 A | 12/1999 | Farwell |
| 6,006,938 A | 12/1999 | Mozley et al. |
| 6,065,485 A | 5/2000 | Rooker |
| 6,086,773 A * | 7/2000 | Dufresne et al. ............. 216/8 |
| 6,178,983 B1 | 1/2001 | Cullinane et al. |
| 6,192,914 B1 | 2/2001 | Farwell |
| 6,220,269 B1 | 4/2001 | Muddiman et al. |
| 6,238,847 B1 | 5/2001 | Axtell, III et al. |
| 6,241,113 B1 | 6/2001 | Mozley et al. |
| 6,254,982 B1 | 7/2001 | Clark |
| 6,257,267 B1 | 7/2001 | Saijo et al. |
| 6,265,097 B1 | 7/2001 | Konno et al. |
| 6,286,702 B1 | 9/2001 | Buermann |
| 6,298,869 B1 | 10/2001 | Strelow |
| 6,318,576 B1 | 11/2001 | Graham et al. |
| 6,321,582 B1 | 11/2001 | Cullinane et al. |
| 6,346,342 B1 | 2/2002 | Li |
| 6,348,281 B1 | 2/2002 | Li |
| 6,349,737 B2 | 2/2002 | Muddiman et al. |
| 6,357,792 B1 | 3/2002 | Shirk et al. |
| 6,378,544 B1 | 4/2002 | DiBello |
| 6,391,472 B1 | 5/2002 | Lamb, III et al. |
| 6,399,175 B2 | 6/2002 | Clark |
| 6,431,383 B1 | 8/2002 | Mozley et al. |
| 6,446,653 B2 | 9/2002 | Cullinane et al. |
| 6,494,074 B2 | 12/2002 | Cullinane et al. |
| 6,515,253 B1 | 2/2003 | Battaglia |
| 6,515,256 B1 | 2/2003 | Battaglia |
| 6,537,693 B1 | 3/2003 | Suzuki et al. |
| 6,589,687 B1 | 7/2003 | Konno et al. |
| 6,607,003 B1 | 8/2003 | Wilson |
| 6,672,389 B1 | 1/2004 | Hinrichs |
| 6,673,389 B1 | 1/2004 | Huntington |
| 6,752,212 B2 | 6/2004 | Burris et al. |
| 6,792,964 B2 | 9/2004 | Farwell et al. |
| 6,809,871 B2 | 10/2004 | Heller et al. |
| 2001/0006075 A1 | 7/2001 | Muddiman et al. |
| 2001/0011471 A1 | 8/2001 | Cullinane et al. |
| 2001/0027807 A1 | 10/2001 | Morishita et al. |
| 2001/0052358 A1 | 12/2001 | Cullinane et al. |
| 2004/0029001 A1 | 2/2004 | Yamazaki et al. |
| 2004/0149705 A1 | 8/2004 | Yamada et al. |

FOREIGN PATENT DOCUMENTS

| | | |
|---|---|---|
| CN | 1039203 | 1/1990 |
| DE | 3102828 | 8/1982 |
| DE | 4041636 | 6/1992 |
| EP | 0010913 | 5/1980 |
| EP | 0018148 | 10/1980 |

| | | | | | | |
|---|---|---|---|---|---|---|
| EP | 0317702 | 5/1989 | | WO | 03052239 | 6/2003 |
| EP | 0770805 | 5/1997 | | | | |
| EP | 0867648 | 7/1999 | | | | |
| EP | 1362687 | 11/2003 | | | | |
| GB | 2091808 | 8/1982 | | | | |
| GB | 2133083 | 7/1984 | | | | |
| GB | 2136879 | 9/1984 | | | | |
| GB | 2169659 | 7/1986 | | | | |
| GB | 2201464 | 9/1988 | | | | |

OTHER PUBLICATIONS

Chinese Office Action for 200910208058.4, dated Dec. 15, 2011, 10 pages.

* cited by examiner

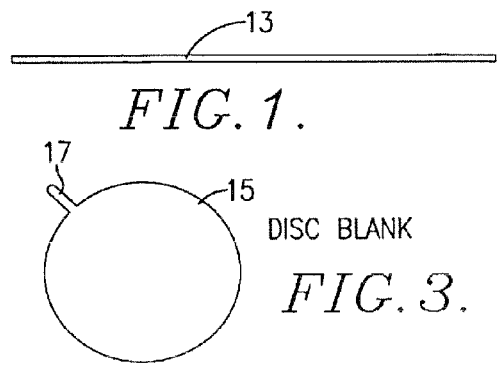
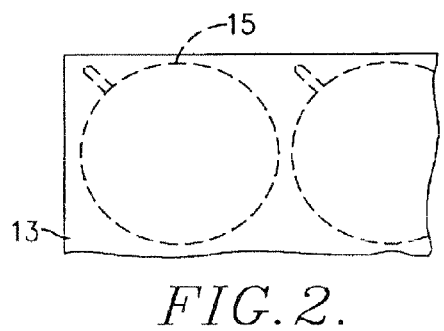
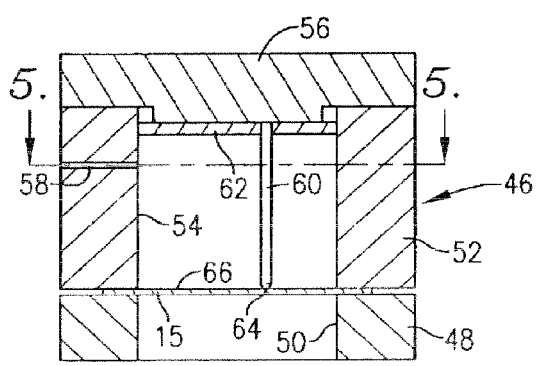
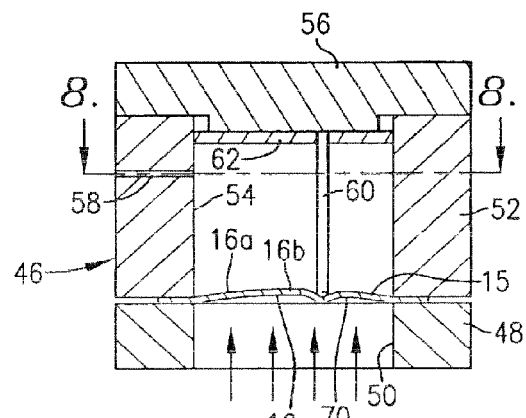
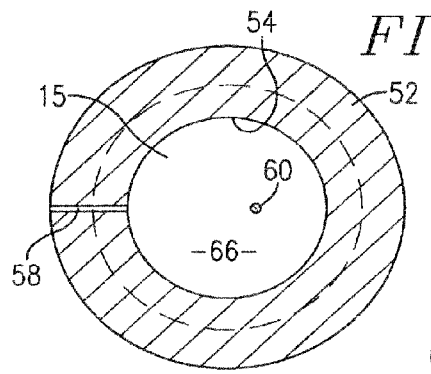
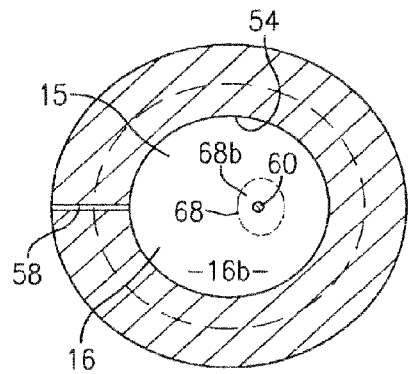
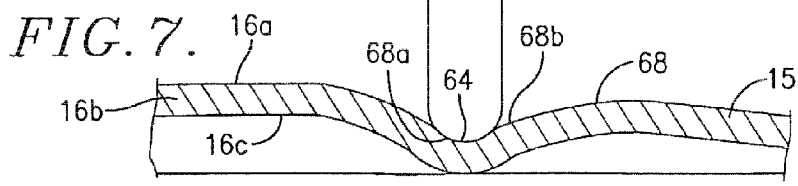

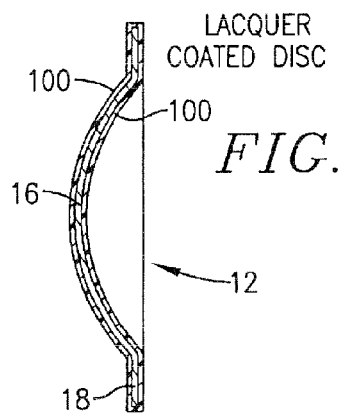
FIG. 15.
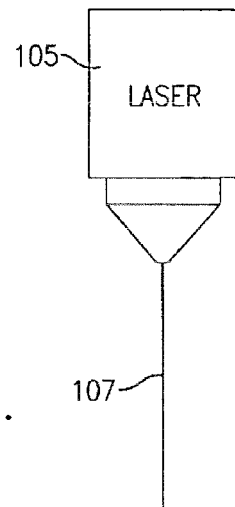
FIG. 16.
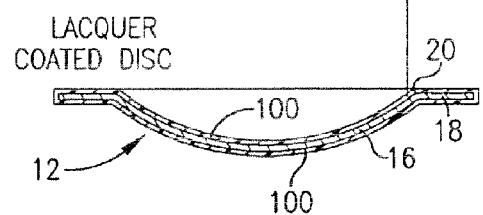
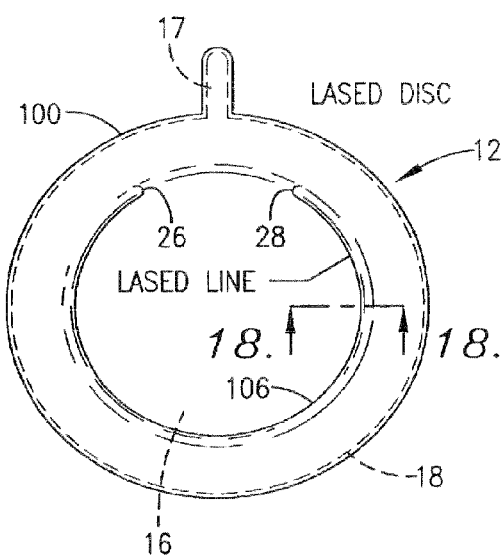
FIG. 17.
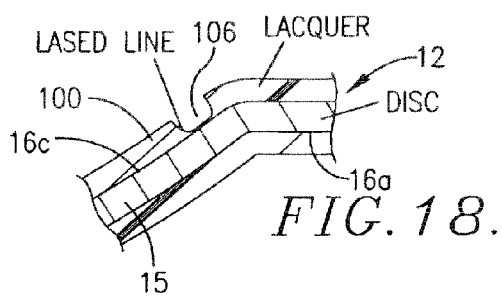
FIG. 18.

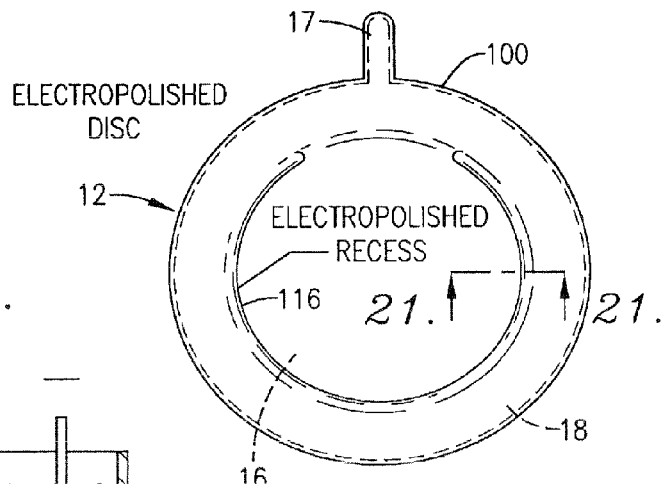
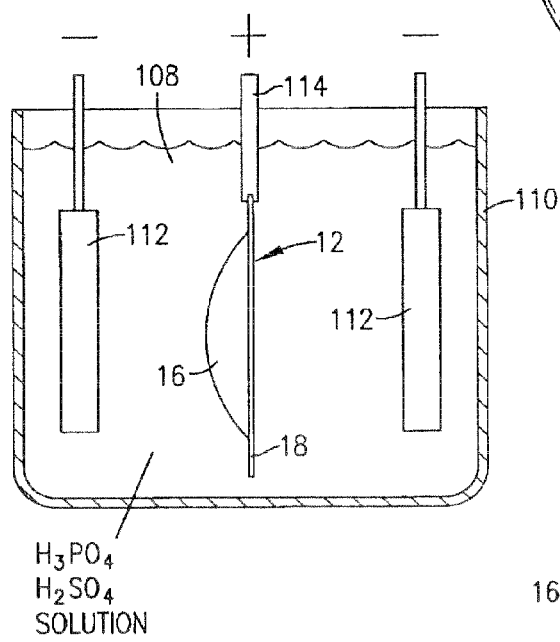
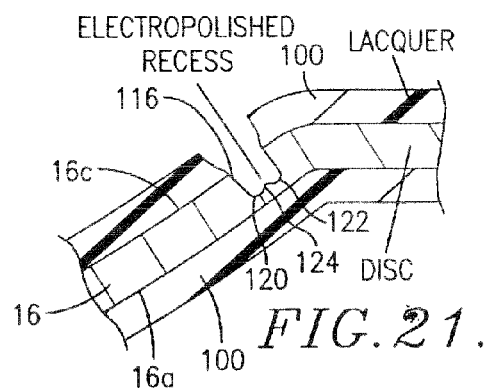
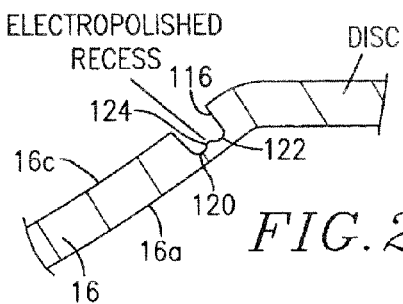
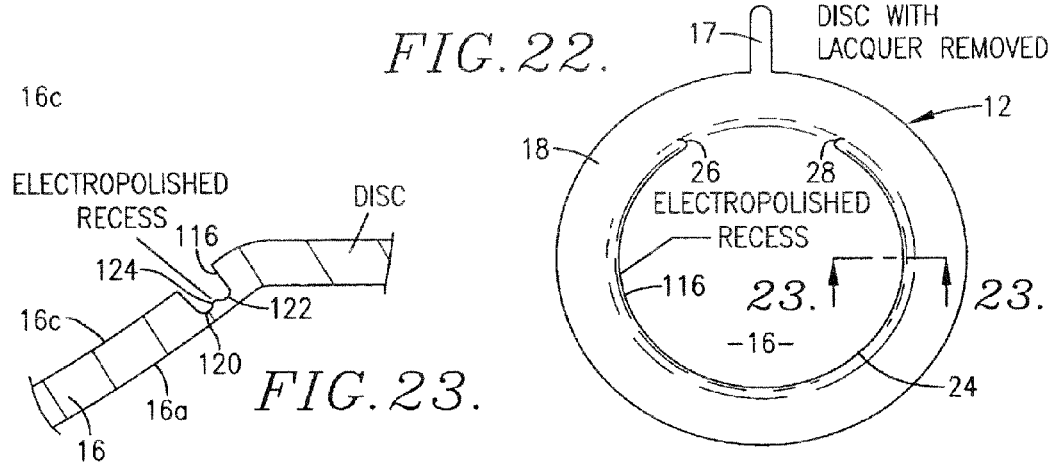

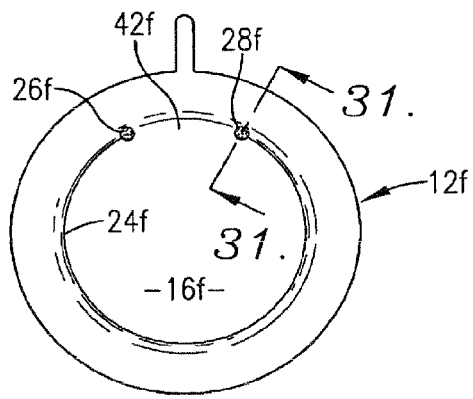
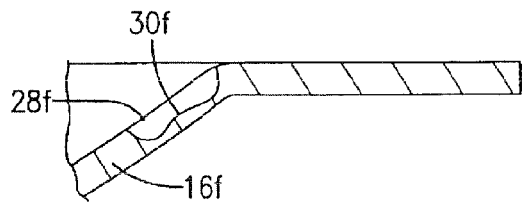
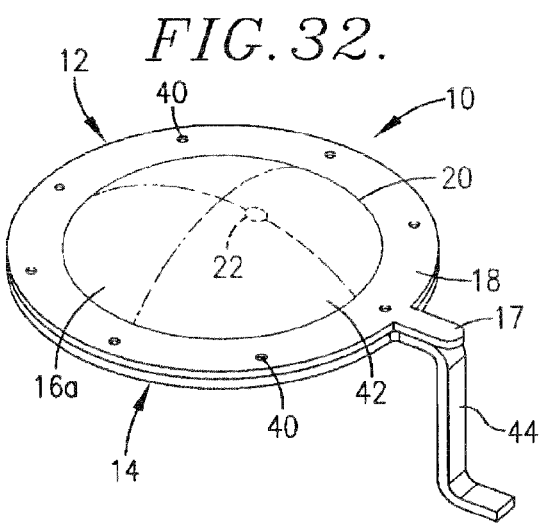
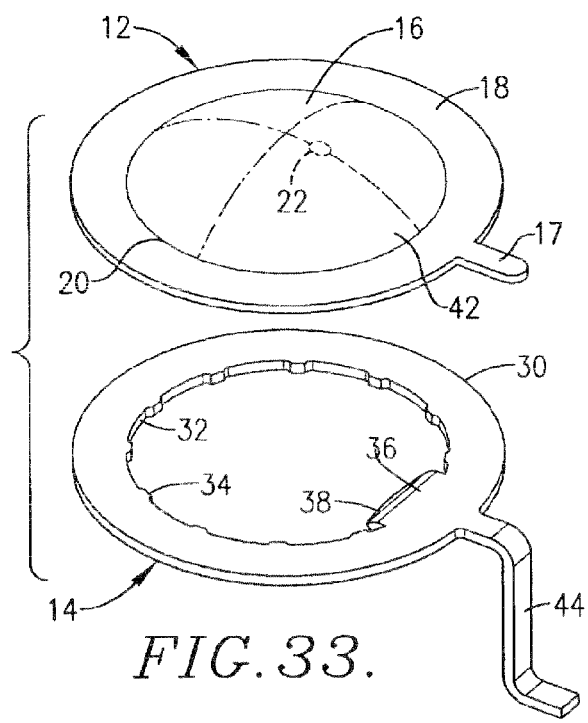
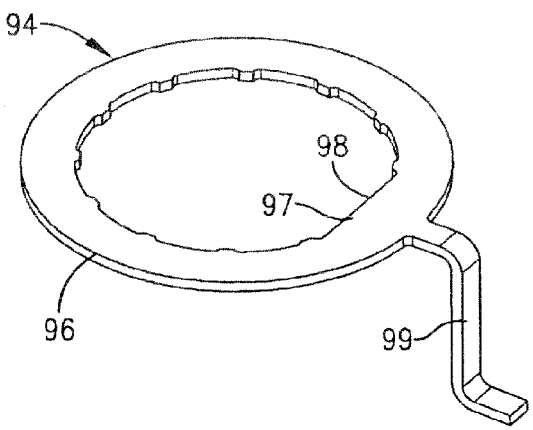
FIG. 30.
FIG. 31.
FIG. 32.
FIG. 33.
FIG. 34.

REVERSE ACTING RUPTURE DISC WITH LASER-DEFINED ELECTROPOLISHED LINE OF WEAKNESS AND METHOD OF FORMING THE LINE OF WEAKNESS

RELATED APPLICATION

This application is a divisional application of U.S. patent application Ser. No. 11/096,466, filed Apr. 1, 2005, incorporated by reference herein.

BACKGROUND OF THE INVENTION

1. Field of the Invention

This invention relates to an improved process for preparing a bulged smooth surface reverse buckling rupture disc assembly in which the bulged section of the disc has an electropolished line-of-weakness recess whereby the disc will reliably reverse and fully open at any one of a wide range of overpressure setpoints.

The present invention relates generally to a reverse acting rupture disc having a laser-defined electropolished line-of-weakness recess, and to an improved method of forming a line-of-weakness recess in a reverse acting rupture disc that assures full opening of the disc upon reversal. The line-of-weakness recess may be configured and strategically located to assure full opening of the disc along the line-of-weakness recess, while at the same time preventing fragmentation of the disc upon reversal. A rupture disc blank is first pre-bulged, followed by final bulging, and then provided with a layer of a resist material. A laser is employed to remove at least a portion of the layer of resist material corresponding to a desired line-of-weakness recess in the concave face of the bulged rupture disc. The disc is then subjected to an electropolishing operation to remove metal from the lased area of the rupture disc, thereby forming a lustrous polished line-of-weakness recess in the disc of desired configuration and of a predetermined depth that is related to material thickness. In the preferred process, electropolishing is controlled to form a line-of-weakness recess defined by spaced opposed channel portions separated by a central raised crown portion wherein the channel portions are of greater depth than said crown portion. The opposed channel portions of the line-of-weakness recess provide opening redundancy and therefore increased tearing reliability along the line of weakness without deterioration of the cycle service life.

Preferably, lasing of the disc is controlled such that a relatively thin residuum of the resist material is left on the disc at the completion of the lasing operation, thus preventing any significant oxidation of the surface of the disc by the laser beam, which would impede or interfere with subsequent electropolishing of the metal. Use of a laser to define a desired line-of-weakness recess in one face of the disc allows the manufacturer to provide any one of an essentially unlimited selection of lines of weakness configurations and disc surface markings.

This invention relates to a reverse buckling rupture disc assembly that has particular utility in sanitary pressure vessel piping applications. Pharmaceutical, biochemical and food processing equipment require that sanitary conditions be maintained at all times, which necessitates frequent cleaning of the equipment, usually with steam or other sanitization agents. These processes often are operable at relatively low level pressures in which overpressures in the equipment or piping connected thereto must be relieved at pressure levels as low as about 2 psig. It is conventional to employ reverse buckling rupture discs for a variety of applications, but it has been found difficult to provide narrow range burst pressure tolerances at low overpressures.

In order to accomplish reliable disc rupture at low differential pressures, it has now been found that a required rupture specification can be met while at the same time avoiding material collection problems on the surface of the disc by subjecting the disc material to a force which deflects a segment region of the disc from the main body thereof, and by thereafter applying a force to the disc which returns the deflected segment region to its initial position whereby the metal of the deflected and returned segment region has an altered grain structure as compared with the metal of the remainder of the central bulged section. The metal of the deflected and returned segment region exhibits higher residual stress than the disc material surrounding the initially deflected segment region resulting from initial plastic deformation of a localized segment region first in one direction, and then plastic deformation of that same localized segment region in the opposite direction.

2. Description of the Prior Art

It has long been known to provide bulged reverse acting rupture discs having a line-of-weakness recess or score line in one face of the disc bulge. The lines of weakness or score lines have generally been cross scores, or a circumferential line-of-weakness recess in the concave face of the disc where the line-of-weakness recess or score line defines the area of the disc that opens upon reversal. With out a line-of-weakness recess defining the opening through the disc upon severing of the disc along the line-of-weakness recess, a bulged disc will reverse but not necessarily fully open. In the case of a circumferentially extending line-of-weakness recess, the line of weakness normally is not a continuous line, thus presenting a hinge area that prevents fragmentation of the central area of the disc upon reversal and opening. A cross scored disc forms four petals that bend outwardly upon reversal of the disc, again preventing fragmentation of the petals. Circumferential score lines or lines of weakness are preferred in low pressure applications because of the larger opening presented upon severing of the disc along the arcuate score line, as compared with a cross scored disc.

Lines of weakness have heretofore been formed in reverse acting rupture discs by a metal scoring die, use of a laser that erodes a groove in the disc, or by chemical etching to remove metal from the disc along a desired line. All of these past reverse acting discs have presented unresolved manufacturing difficulties, or have experienced operational problems in various application uses.

Metal scoring dies work harden the metal material, thus changing the grain structure and density of the metal at the score line. The material surrounding a score line formed with a metal scoring die is work hardened during the scoring process, thus increasing the brittleness of the metal and creating stress zones. The brittleness and increased stress zones of the metal limit the service life of the rupture disc as a result of fatigue cracking and stress corrosion. Metal scoring depths required for satisfactory operation profoundly alter the original bulged dome strength making it difficult to predict the pressure ultimately required to reverse the rupture disc during the initial bulging operation of the disc prior to scoring. Consequently, it is very difficult to produce a reverse acting bulged rupture disc having a score line formed with a scoring die that will both open reliably and withstand multiple successive pressure cycles.

It has also been proposed to form a score line in a reverse acting rupture disc using a laser beam. These proposals have not proved commercially satisfactory for a number of reasons. The reflectivity of the metal makes it difficult to control the penetration of the beam into the thickness of the metal and thereby form a smooth groove of uniform depth along the length of the intended line-of-weakness recess. Furthermore, lasers significantly heat and burn the disc, oxidize the material and change the metallurgy of the metal. Discs having lines of weakness burned by a laser have been found to be unsatisfactory in use, not only from the standpoint of unreliable openings at required pressure relief values, but also having undesirable cycle life.

Chemical etching of a rupture disc having a segmented resist layer defining a line of weakness has also been suggested in the prior art, as for example shown and described in U.S. Pat. Nos. 4,122,595, 4,597,505, 4,669,626, and 4,803,136. The patentee in the '595 patent suggests screen printing of a resist material on a flat rupture disc where the screen has openings presenting a pattern of the desired line of weakness. After bulging of the disc, an acid solution is sprayed onto the disc to etch a line of weakness coincident with the area of the disc unprotected by the resist material. The metal surface of the disc material is somewhat irregular and not perfectly smooth because the individual side-by-side grains have peaks with valley structure between the grains. Therefore, when an acid etchant agent is applied to the surface of the metal, that agent does not act uniformly across the surface of the metal. Instead, the etchant is more aggressive in the valleys between the grains than in eroding the higher surface peaks of the metal grains. The etchant agent contained in the valley cavities is believed to not only more rapidly erode the metal in the valley area as compared with the surrounding peak areas of the grains, but to also do so more efficiently. The attendant result of the etching process is to exaggerate the roughness of the metal surface, with the degree of surface irregularity increasing with time of exposure of the metal to the etchant agent. The rupture discs are manufactured from materials that are inherently corrosion resistant, such as stainless steel, inconel, Hastalloy-C, and monel. As a consequence, subjection of these inherently corrosion resistant materials to an etchant acid requires that the etchant agent remain in contact with the surface of the metal for extended periods of time in order to erode away a groove that typically is as much as 70-90% of the thickness of the metal. For example, if the material is 0.004 in. thick, as much as 0.0036 in. must be eroded during the etching process.

In addition, in order to accomplish reasonably efficient erosion of these corrosion resistant materials, the etchant agent chosen must be one tailored for the particular type of metal. Thus, a different acidic agent is required for each of the various metals. The specific material used to manufacture a particular rupture disc must be selected to meet the specifications of the application. Different disc applications require use of different types of metal. Therefore, when an etching process is used to form a line of weakness in corrosion resistant disc material, the manufacturer should have available an etchant agent that is most effective in eroding that specific corrosion resistant metal.

The patentees in the '136 patent describe passing the strip of metal to be etched through a suitable etching bath, where the rate of feed of the metal strip within the bath, the acidity concentration of the bath, and the bath temperature are controlled to obtain an etched groove of preselected depth. The patentees describe the remaining material at the bottom of the groove as being a flat membrane extending along the length of the etched area.

Because the surface of an etched line of weakness has been further roughened as a result of the etching process as compared with the original surface finish of the metal material, stresses imposed on the metal defining the line of weakness during cycling of the disc are exaggerated thus reducing the cycle life of the disc. The increased surface area of the roughened line of weakness groove makes the surface area less resistant to corrosive effects which further decreases the cycle service life of the disc. This is important because after a rupture disc is mounted in place, that disc may remain in that position for many years without being operated by an overpressure condition. However, if an overpressure event occurs, the reverse acting rupture disc must function reliably, throughout the service life cycles established for that disc.

Furthermore, an etching process, if attempted on a commercial basis, cannot be economically justified for a number of reasons, including the need to have on hand a specific etchant agent for each type of metal, and the inordinate time required to obtain removal of sufficient material defining the line of weakness.

In order to obtain repeatable low overpressure opening of rupture disc assemblies designed for reverse acting applications, one commercial approach to the requirement has been to provide a reverse buckling rupture disc in which a dimple is deliberately formed in the dome of the rupture disc. The dimple in the domed area of the disc is strategically located in a position such that the domed part of the disc will fail first at the area of the dimple. The disc thus reverses and opens at what has been described the prior art as an overpressure less than a disc without a dimple.

However, a dimple in the process side convex surface of the bulged area of the disc presents a cavity that serves as a collection point for food, pharmaceuticals or the like. As a result, cleaning of the processing equipment with steam or the like is difficult and may require breakdown of the components in which the rupture disc is positioned in order to insure removal of material that may have collected in the dimple.

Exemplary of a prior art rupture disc assembly having a dimple in the convex surface of the disc is Cullinane, et al., U.S. Pat. No. 6,494,074, in which a pointed tool forced against the backed up convex surface of the bulged section of a disc forms a dimple in the disc at or near the apex of the domed shape. The shape, area and depth of the dimple is said to be selectively variable. In each instance though, the dimple in the convex surface of the bulged section of the disc presents a cavity which may collect material from the process operation that is detected from a predetermined overpressure by the disc mounted in a pipe fitting leading to the processing pressure vessel. Although Cullinane et al. suggest that the depth of the dimple may be altered, but not eliminated, the patentees did not perceive that a smooth surface disc could be provided which avoids material collection problems in a dimple in the disc by forming an indentation in the disc which is then returned to its initial smooth surface position, while at the same time meeting more stringent burst specifications. Furthermore, the present improved reverse acting rupture disc and process for fabrication of the disc allows the burst pressures to be altered by selectively controlling the amount of the pre-bulging pressure, notwithstanding the elimination of a residual dimple in the bulged portion of the disc.

FIGS. 6-9 of Graham et al., U.S. Pat. No. 6,318,576, illustrate a hygienic quick breakdown and reconnection fitting conventionally used in pharmaceutical, biochemical and food processing operations, which is adapted to receive and retain a reverse bulging rupture disc assembly. The fitting includes two couplings having flanges which are retained in adjacent interconnected relationship by a quick release clamp ring.

Reverse buckling rupture discs are preferred for differential pressure applications because a reverse buckling disc will open at a pressure near the bursting pressure of the disc without producing fatigue and Failure which often time occurs with a forward acting disc when the disc is operated near its burst pressure for long periods of time. One theory of the sequence of operation of a non-knife blade reverse buckling rupture disc is explained in Mozley, U.S. Pat. No. 4,512,171.

A commercially acceptable reverse buckling sanitary rupture disc should ideally meet current ASME BPE (Bioprocessing Equipment) and 3-A (milk and dairy) standards, which require the equipment to be free of surface imperfections such as crevices, gouges, obvious pits, etc.

SUMMARY OF THE INVENTION

The reverse acting rupture disc of this invention, which has particular utility in sanitary conditions, has a central bulged section including a convex face and an opposed concave face with a flange portion surrounding the central bulged section. The convex face of the bulged section is smooth and of substantially uninterrupted configuration. A metal segment region of the bulged section has altered grain structure as compared with the remaining metal of the bulged section of the disc and defines a segment region in a preferred embodiment having a outer generally circular boundary located nearer to the uppermost part of the bulged section than to the flange portion of the disc. The segment region has been physically displaced from the main body of the bulged section, and then returned to its original position. The altered grain structure of the segment region results from strain hardening of the metal through plastic deformation creating greater residual stress in the segment region than in the remainder of the bulged section.

The bulged reverse acting rupture disc is a relatively thin, metallic member having a laser-defined electropolished line of weakness in the concave face of the disc. The line-of-weakness recess is preferably C-shaped leaving a hinge area between opposite extremities of the C-line, and located adjacent but slightly inboard of the transition area between the bulged section of the disc and the circumferentially extending flange section of the disc. The line-of-weakness recess is defined by spaced opposed sidewall surfaces joined by a bottom wall surface wherein the surfaces of the line-of-weakness recess have a lustrous, electropolished surface finish that is at least about 6 times smoother, and preferably at least about 8 times smoother than the surface finish of the metallic member. The surface finish of the electropolished recess is preferably no greater than about 4 microinches, and most preferably is no greater than about 2 microinches of average deviation from the mean surface. Thus, the line-of-weakness recess formed by the electropolishing process is defined by spaced opposed channel portions separated by a central raised crown portion wherein the channel portions are of greater depth than the crown portion whereby the recess is generally W-shaped in cross-section.

The reverse acting rupture disc is preferably fabricated by first pre-bulging a disc blank in a fixture with pressurized air being applied to a central section of the blank in order to pre-bulge that central section. A post is positioned in the fixture in disposition to engage and deflect the central section of the blank as pressurized air is applied against the central section of the blank at a predetermined rate to pre-bulge the disc blank. Pre-bulging of the blank against the post causes a relatively small indentation to be formed in the central section of the blank, preferably offset to a certain extent from the center of the bulged central section. After retraction of the post, the disc is then bulged to its final dome height.

The deflected metal segment region of the pre-bulged section of the disc blank has altered grain structure as compared with the remaining metal of the pre-bulged section of the disc. In a preferred embodiment of the disc in which a post is used to deflect a segment of the pre-bulged section of the disc, the deflected segment has an outer generally circular boundary located nearer to the uppermost part of the bulged section than to the flange portion of the disc. The segment region physically displaced from the main body of the bulged section, is returned to its original position during final bulging of the disc. The metal of the deflected and returned segment region exhibits higher residual stress than the disc material surrounding the initially deflected segment region as a result of initial plastic deformation of a localized segment region first in one direction, and then plastic deformation of that same localized segment region in the opposite direction.

The region of the disc which has been deflected and then returned to its original disposition is subjected to stresses in a localized area in two directions that in sum are greater than the stresses imposed on the main body of the bulged section of the disc during final bulging. The result is a disc having a bulged section without an indentation or depression which could collect materials from the processing apparatus and therefore can be more readily maintained and cleaned. Moreover, the deflection and subsequent return of a segment region of the bulged section of the disc produces a disc having necessary rupture tolerance characteristics permitting use of the disc in pharmaceutical, biochemical and food processing applications where the specification requires a close tolerance low burst pressure rupture disc product.

In one process for producing a sanitary rupture disc having a region in the bulged section of the disc of greater tensile strength than the main body of the bulged section, a flat disc blank is located in a fixture having a deflection post such that the post is in engagement with one surface of the disc in a position offset somewhat from what will become the center of the bulged section. The deflection post preferably has a hemispherical blank engaging end. The post diameter is selected to form an indentation in the blank of predetermined extent depending upon the size of the rupture disc, the material from which the disc is fabricated, the tensile strength of the metal blank, the diameter of the bulged area to be formed in the blank, the positioning of the indentation with respect to what will become the central axis of the bulged section of the disc, and the burst pressure differential specification for the final product.

Pre-bulging pressure is applied to the face of the rupture disc blank opposite the deflection post while the blank is held in the fixture to effect partial bulging of the blank and at the same time cause an indentation to be formed in the partially bulged convex surface of the blank in engagement with the deflection post. The diameter of the area subjected to the pre-bulge pressure should preferably be equal to the diameter of the final bulged section of the disc.

Next, either the deflection post is retracted, or the preformed blank is positioned in a separate final bulging non-post fixture. Sufficient pressure is applied to the concave surface of the pre-bulged disc to effect final bulging of the central section of the disc and at the same time return the indentation previously formed in the disc to its initial position with respect to the remainder of the disc body prior to formation of the indentation in the disc body by the deflection post. As a result, both the convex and concave surfaces of the disc are smooth and free of projecting surfaces or depressions that could collect materials thereon or therein, thus interfering with or impeding cleaning of the equipment with a sanitizing agent such as steam.

The two step process of first forming an indentation of predetermined extent and depth in the portion of the blank body that is to be bulged, and then to remove the indentation by returning the metal of the indentation to its initial position causes the area that has been indented and then restored to have a higher residual stress than the remainder of the final bulged section of the disc, as a result of the plastic deformation of the metal in the segment region. The segment region, which has an altered grain structure, is relatively small compared with the overall area of the bulged section, is work hardened and exhibits a higher tensile and compressive strength, thus behaving differently during use than the remainder of the bulged section when an overpressure is applied to the convex face of the rupture disc.

After pre-bulging and final bulging of the disc blank, a layer of resist material is provided on at least the concave face of the bulged disc, and most usually on both faces of the disc by dipping the disc in a solution of the resist material. A lacquer formulation is the preferred resist material. After hardening of the resist material, a laser beam is used to remove a portion of the resist material from the concave face of the bulged disc, most usually along a C-shaped line adjacent to but spaced inboard of the transition region between the bulged section and the peripheral flat plan section of the disc. The laser beam is controlled such that the beam moves along the concave surface of the domed blank to remove almost all of the resist material, while leaving only a minute residuum of the resist material on the surface of the disc blank. It is preferred that the laser beam be controlled to define the extent of the intended line-of-weakness recess in the disc, but not allowed to directly contact and therefore oxidize the surface of the metal along the path of travel of the beam.

The lased disc is then positioned in electropolishing equipment containing an acid agent bath. The preferred agent is not an etchant solution of a type that in and of itself significantly etches the surface of the metal. The disc is connected in an electrical circuit in which the disc functions as the anode while a conductive element in the bath is the cathode. Voltage is applied to the disc/anode whereby the acid agent of the bath commences immediate removal by electropolishing of the metal in the area of the disc unprotected by the resist material. The electropolishing of the line of weakness is continued until the depth of the recess formed by electropolishing is from about 70%±25% to about 70%±5% of the thickness of the disc blank. Thereafter, the resist material is removed, and the final reverse acting rupture disc subjected to cleaning.

The electropolishing procedure forms a recess in the bulged area of the disc corresponding to the lased line in the resist material on the surface of the disc. The electropolished recess is defined by spaced opposed channel portions separated by a central raised crown portion with the channel portions being of greater depth than the crown portion. The opposed channel portions of the line-of-weakness recess provide tearing of metal redundancy throughout the length of the line of weakness thereby assuring full opening of the central section of the disc for the full service life of the disc.

An important advantage of the present invention is the ability to vary the reversal pressure properties of disc material of the same thickness used for fabrication of multiple lots of disc assemblies over a wider range than heretofore possible, with each lot meeting essentially the same reversal pressure specifications. Varying the height of the dome during pre-bulging of the disc blank while the dome height of the final bulge is maintained constant permits variation of the reversal pressure of discs using the same thickness of the material over a wider pressure range, than varying the dome height of the final bulge while maintaining the pre-bulge height of the dome constant. This is especially significant for fabrication of reverse acting rupture disc assemblies intended for liquid applications where maintaining a high dome height is advantageous.

BRIEF DESCRIPTION OF THE DRAWING FIGURES

FIG. 1 is a schematic representation of a length of sheet metal material used for production of reverse acting rupture discs in accordance with the present invention;

FIG. 2 is a fragmentary plan view of the metal sheet of FIG. 1 and showing in dashed lines the outline of rupture disc blanks to be formed from the metal sheet material of FIG. 1;

FIG. 3 is a schematic plan view of a disc blank formed from the sheet material of FIG. 2;

FIG. 4 is a schematic cross-sectional representation of apparatus for pre-bulging a rupture disc blank that includes a deflection post for forming an indentation in one surface of the blank;

FIG. 5 is a horizontal cross-sectional view taken substantially on the line 5-5 of FIG. 4 and looking downwardly in the direction of the arrows;

FIG. 6 is a schematic cross-sectional representation of the pre-bulging step using the fixture illustrated in FIG. 4 and which results in a segment region of a rupture disc blank being deflected from the main body of the blank;

FIG. 7 is an enlarged fragmentary schematic representation of the pre-bulged disc having an indented segment region in the partially bulged convex surface of the disc blank produced by the deflection post and which was formed by the deflection post;

FIG. 8 is a horizontal cross-sectional view taken on the line 8-8 of FIG. 6 and looking downwardly in the direction of the arrows;

Figure 10:
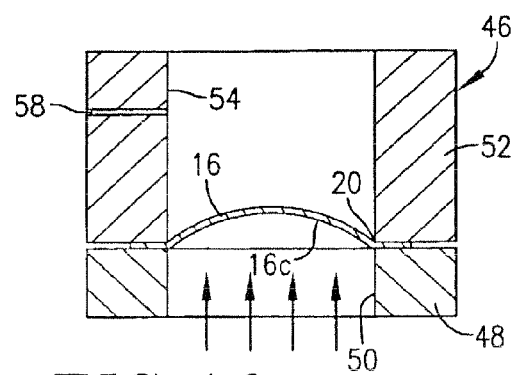
Figure 11:
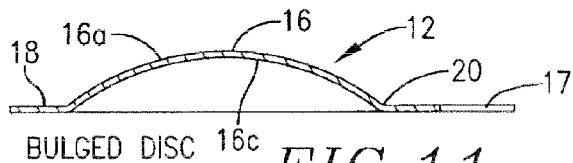
Figure 12:
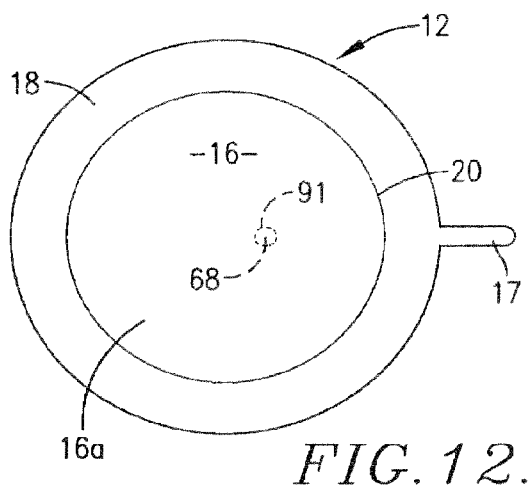
Figure 14:
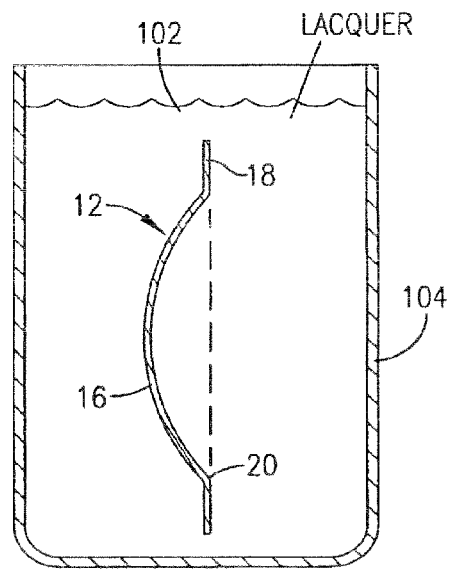
Figure 13:
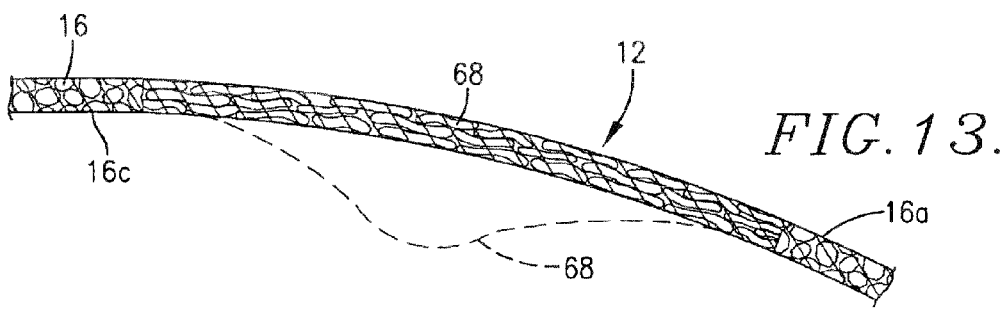
Figure 24:
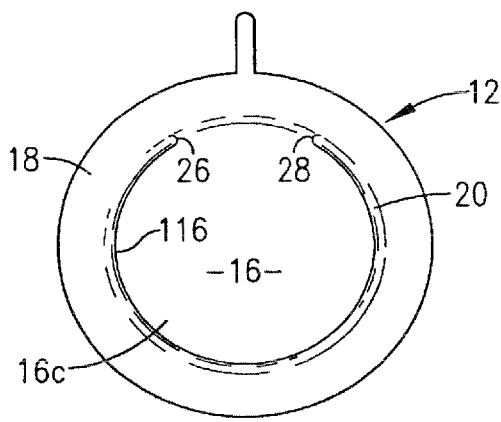
Figure 25:
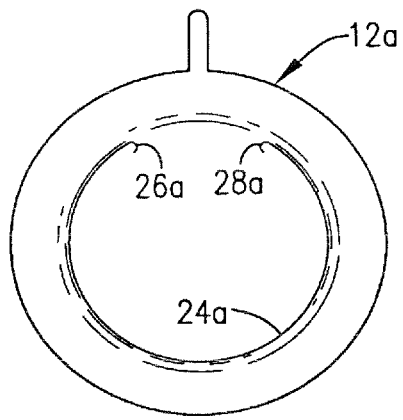
Figure 26:
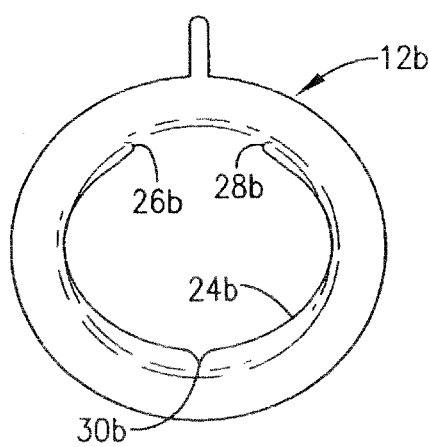
Figure 27:
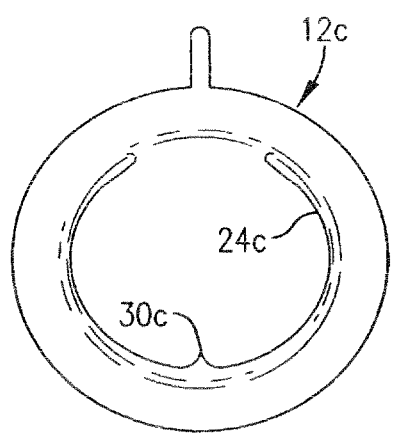
Figure 28:
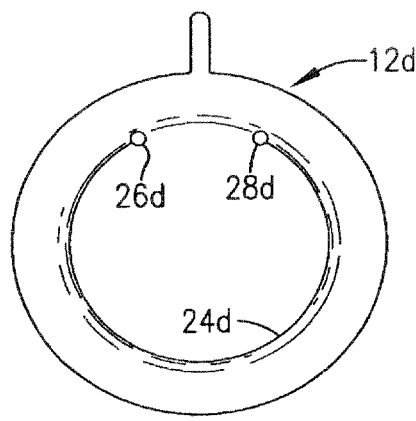
Figure 29:
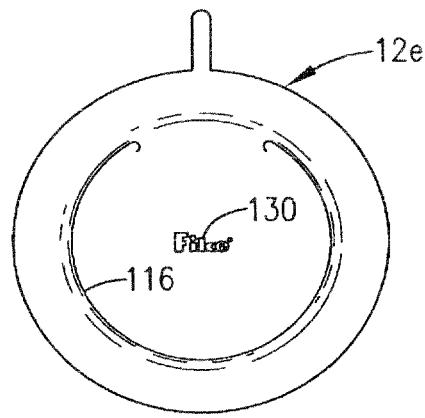
Figure 35:
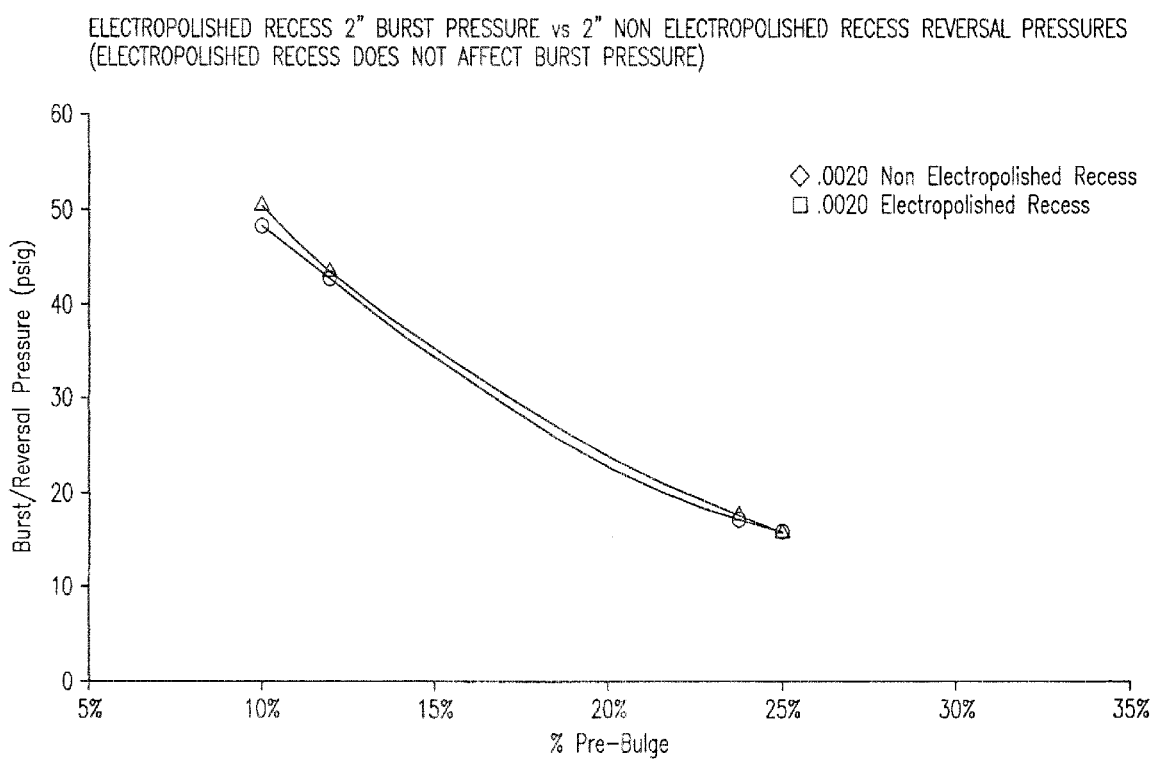

FIG. 10 is a schematic cross-sectional representation of the fixture as shown in FIG. 6 with the post removed and illustrating the manner in which sufficient pressure is applied to the concave face of the pre-bulged rupture disc to effect final bulging of the rupture disc and effect return of the previously indented segment region of the bulged section to its initial position before formation of the indentation therein during pre-bulging of the central section of the disc;

FIG. 11 is a schematic cross-sectional view of the final bulged disc in which the initial indentation in the central section of the disc has been ironed out during final bulging of the disc blank;

FIG. 12 is a plan view of the bulged disc as shown in FIG. 11, with the ironed out, initially indented segment of the disc being depicted by the circular dashed lines;

FIG. 13 is an enlarged cross-sectional representation of the portion of the bulged section of the rupture disc and which schematically illustrates the altered grain structure of the initially indented segment region of the bulged section of the disc that has been returned to its original position, as compared with the metal of the remaining portion of the bulged section;

FIG. 14 is a schematic depiction of one method of coating the bulged rupture disc of FIG. 12, with a fast-drying lacquer material;

FIG. 15 is a schematic central cross-sectional view of the lacquer-coated bulged rupture disc;

FIG. 16 is a schematic depiction of the manner in which a laser beam is used to form a lased line in the lacquer coating defining a desired line of weakness to be formed in the bulged section of the rupture disc;

FIG. 17 is a plan view of the disc illustrating one form of a lased line defining the configuration of a line of weakness recess to be formed in the disc;

FIG. 18 is a vertical enlarged fragmentary cross-sectional view taken substantially along the line 18-18 of FIG. 17 and looking in the direction of the arrows;

FIG. 19 is a vertical cross-sectional view of a schematic representation of electropolishing equipment for forming a line-of-weakness recess in the bulged section of the disc along the lased line in the lacquer coating on the disc;

FIG. 20 is a plan view of the disc in which an electropolished recess has been formed in the bulged section of the disc using the electropolishing equipment of FIG. 19;

FIG. 21 is a fragmentary enlarged schematic cross-sectional representation of the illustrating the electropolished recess formed in the polished section of the disc;

FIG. 22 is a plan view of the disc having an electropolished recess corresponding to the lased line in the lacquer coating, and with the lacquer removed;

FIG. 23 is an enlarged fragmentary vertical cross-sectional view taken on the line 23-23 of FIG. 22 and illustrating the cross-sectional shape of the electropolished recess in the bulged section of the disc;

FIG. 24 is a plan view of a reverse acting rupture disc having an electropolished line-of-weakness recess in the disc in accordance with one embodiment of the invention wherein the opposed end extremities of the line-of-weakness recess are curved outwardly and extend away from one another;

FIG. 25 is a plan view of a reverse acting rupture disc having an electropolished line-of-weakness recess in the disc in accordance with another embodiment of the invention wherein the line-of-weakness recess has spaced, opposed inwardly-curved end extremities directed toward one another;

FIG. 26 is a plan view of a reverse acting rupture disc having an electropolished line-of-weakness recess in the disc in accordance with a further embodiment of the invention wherein the radius of the line-of-weakness recess varies and has outwardly curved end extremities and wherein the portion of the line-of-weakness recess opposite the hinge portion of the bulged section of the disc has an outwardly directed generally V-shaped peak segment;

FIG. 27 is a plan view of a reverse acting rupture disc having an electropolished line-of-weakness recess in the disc in accordance with a further embodiment of the invention wherein the radius of the line-of-weakness recess varies and has outwardly curved end extremities and wherein the portion of the line-of-weakness recess opposite the hinge portion of the bulged section of the disc has an inwardly directed generally V-shaped peak segment;

FIG. 28 is a plan view of a reverse acting rupture disc having an electropolished line-of-weakness recess in the disc in accordance with a further embodiment of the invention wherein the line-of-weakness recess has spaced, opposed, generally circular end extremities;

FIG. 29 is a plan view of a reverse acting rupture disc having an electropolished line-of-weakness recess in the disc in accordance with a further embodiment of the invention wherein the line-of-weakness recess has spaced, opposed inwardly-curved end extremities directed toward one another, and wherein the bulged section of the disc is provided with an electropolished logo for identification purposes;

FIG. 30 is a plan view of a reverse acting rupture disc having an electropolished line-of-weakness recess in the disc in accordance with a further embodiment of the invention wherein the line-of-weakness recess has spaced, opposed, generally circular cavities at the end extremities of the line of weakness;

FIG. 31 is an enlarged vertical cross-sectional view along the line 31-31 through a cavity at one end of the line of weakness, and looking in the direction of the arrows;

FIG. 32 is a perspective view of a reverse buckling sanitary rupture disc assembly in accordance with this invention;

FIG. 33 is an exploded view of the components making up the reverse buckling rupture disc assembly;

FIG. 34 is a perspective view of an alternate form of a support ring forming a part of the rupture disc assembly shown in FIG. 32; and FIG. 35 is a graphical representation demonstrating that the reversal pressure of discs that have an electropolished line-of-weakness recess defining the opening area of the disc is essentially the same as the reversal pressure of a disc that does not have a line of weakness, which is not true with reverse acting rupture discs having a scored line of weakness.

DETAILED DESCRIPTION OF THE INVENTION

A reverse buckling sanitary rupture disc assembly 10 embodying preferred concepts of this invention is illustrated in FIG. 32 of the drawings. Disc assembly 10 includes a rupture disc 12 and a support ring 14 secured thereto. The rupture disc assembly 10 is particularly adapted for use in hygienic, sanitary applications in industries such as pharmaceuticals, biochemical and food processing operations. Accordingly, the components of rupture disc assembly 10 are preferably fabricated of corrosion resistant metal material such as any one of a number of conventional corrosion-resistant metals such as stainless steel alloys, Hastalloy-C, Monel, Inconel, and nickel. Rupture disc 12 has a central bulged section 16, and an annular flange portion 18. A transition zone 20 joins the inner periphery of flange portion 18 to the outer circular margin of bulged section 16.

The bulged section 16 of rupture disc 12 has a relatively small region 22 (FIGS. 32 and 12) which is offset from the central axis of bulged section 16. The metal of region 22 has an altered grain structure and exhibits higher tensile strength than the remainder of bulged section 16, and has been formed by indenting the convex surface 16a, and then returning the indentation to its initial position so that the convex surface 16a of bulged section 16 is smooth without any significant interruptions.

Bulged section 16 of rupture disc 12 is provided with a semi-circular line-of-weakness recess 24 that is in the bulged section 16 of the disc inboard of and generally complemental with transition zone 20, as is illustrated in FIG. 22. It can be seen from FIG. 22 that line-of-weakness recess 24 has terminal ends 26 and 28 that are spaced from each other along the length of transition zone 20. In the embodiment of the disc shown in FIG. 22, the terminal ends 26 and 28 of line-of-weakness recess 24 are curved outwardly away from one another, and are of generally C-shaped configuration.

The backup ring 14 has a main annular body 30 configured to underlie the flange portion 18 of rupture disc 12. It is to be seen from FIG. 33 that the inner semi-circular edge 32 of annular body 30, has plurality of circumferentially spaced projections 34 that extend inwardly from edge 32 of body 30. The ring 30 may have any number of projections 34, varying from 0 to 11 as shown in FIG. 33, or more. An inwardly extending tongue 36 is integral with body 30, has an outermost downturned end portion 38, and also projects into the inner opening of ring body 30. An alternate embodiment 94 of ring 14 is shown in FIG. 34 and has an annular body 96 provided with an unitary inwardly-directed segment 97 provided with an outermost linear edge 98.

In its assembled condition, the annular body of support ring 30 is secured to the flange 18 of disc 12 by fasteners 40 which may comprise screws, tack welds, adhesive or other equivalent fastening means. The tongue 36 of backup ring 14 is preferably positioned between terminal ends 26 and 28 of line-of-weakness recess 24 and acts as a backup for the hinge area 42 of bulged section 16 of rupture disc 12 defined by line-of-weakness recess 24. The projections 34 are of a size and strategically located to directly underlie and support the bulged section 16. If desired, an essentially Z-shaped component 44 may be provided as a part of the annular body 30 of rupture disc assembly 10 for assisting an individual in properly orienting the assembly during installation. Similarly, the ring 94 may also a Z-shaped component 99 that has a similar function to the component 44 of ring 14. An annular gasket (not shown) may be provided in association with the flange portion and support ring of the disc assembly.

The rupture disc 12 is fabricated from a sheet 13 of corrosion-resistant material as previously described, that may be unrolled from a large roll of the selected metal. A disc blank 15 is stamped, laser cut, or EDM cut from the sheet 13. Preferably, the disc blank 15 has a peripheral unitary alignment tang 17. Fabrication of the rupture disc 12 is preferably accomplished in two stages. The first stage involves prebulging of the disc in a manner to form an indentation in the convex surface of a disc blank 15. The second stage involves Final bulging of the disc under conditions such that the indentation in the convex surface of the bulged section of the disc is removed by returning the indented segment region of the bulged section to its initial position.

A fixture 46 for forming an indentation of predetermined configuration in the metal rupture disc blank is schematically illustrated in FIG. 4. It is to be understood in this respect that the schematic depiction of fixture 46 is for illustrative purposes only and not intended to be representative of a particular type of fixture for accomplishing the intended result. The lower base ring 48 of fixture 46, which in its preferred form is of cylindrical configuration, has a central opening 50. The cylindrical clamping ring 52 of fixture 46 has a central passage 54 aligned with and has the same shape and cross-sectional area as opening 50. Cover member 56 closes the opened upper end of passage 54 of clamping ring 52. An opening 58 through the side wall of clamping ring 52 serves to allow gas such as air to escape from the interior of clamping ring 52. Although not illustrated, it is to be understood that the base ring 48 and/or the clamping ring 52 have a groove(s) for complementally receiving the tang 17 of a respective disc blank 15, so that the blanks 15 are all repetitively located in the fixture 46 in the same position.

An elongated deflection post 60 is positioned within passage 54 and preferably is coupled to a support element 62 laying against the under face of cover 56. After placement of metal disc blank 15 on support base ring 48, the disc 15 is clamped in place by ring 52 and base ring 48 positioned as shown in closing relationship to passage 54. Although in a preferred embodiment the outermost extremity of post 60 is hemispherical as shown, the terminal end of post 60 may be square, cross-sectionally star-shaped, or any other desired configuration. The post 60 is of a length such that the terminal end 64 rests against the surface 66 of disc blank 15.

Air under a pre-bulging pressure is introduced into fixture 46 via central opening 50 to effect pre-bulging of the disc blank 15, which causes the segment region 68 of disc 15 to be deflected from the main body of pre-bulged section 16b in a downward direction as shown in FIG. 4. The depth of the indented segment region 68, and the configuration and extent of such indentation is a function of the diameter of post 60, the shape and radius of the hemispherical end 64 of post 60 and the pressure applied to the surface 70 of disc blank 15. In the case of a post 60 having a hemispherical end 64, the indented segment region 68 has a generally hemispherical portion 68a and a tapered somewhat conical surface 68b leading to and terminating in the main body portion 16b of bulged section 16. Viewing FIG. 7, it can be seen that the central generally hemispherical indented segment region 68a is surrounded by a generally circular or oval shaped indented portion 68b radiating outwardly from the indented segment region 68a. During application of pressure to disc blank 15 to pre-bulge the disc blank, air within the cavity defined by passage 54 and cover 56 may escape from passage 54 via opening 58 in clamping ring 52.

Figure 9:
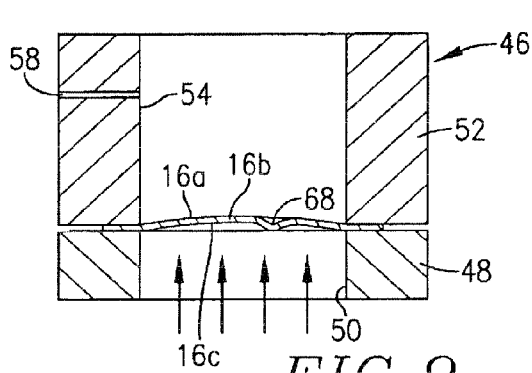
FIG. 9 is a schematic cross-sectional representation of the fixture as shown in FIG. 4 and illustrating the manner in which pressure is applied to the concave face of the pre-bulged rupture disc to effect final bulging of the rupture disc.

Upon completion of the pre-bulging step, the cover 56 and associated deflection post 60 are removed from clamping ring 52. Pressure is applied to the concave face 16c of disc blank 15 sufficient to complete final bulging of the bulged section 16 of rupture disc 12 is depicted in FIG. 9. The amount of pressure applied during final bulging of rupture disc 12 should be adequate to not only completely bulge disc 12 forming bulged section 16, but also sufficient to return indented segment region 68 to its initial position as shown in FIG. 10. Thus, the convex surface of 16a of bulged section 16 is smooth and uninterrupted throughout its entire area including segment region 68 defining region 22. Indentation of segment region 68 followed by return of such indentation to its initial position causes the metal of region 22 to have an altered grain structure, as schematically shown in FIG. 13.

It has been found that by forming an indentation 68 in the disc blank 15 during pre-bulging of the disc, in which deformation of the metal occurs plastically in one direction, and then plastic deformation of the metal occurs in the opposite direction during final bulging of the disc blank 15, thereby returning the metal to its original position with the opposed concave and convex surfaces of the area 68b being complemental with the curvature of the opposed concave and convex faces of the bulged section 16, reversal of the bulged section at a predetermined and preselected pressure is initiated in the area 68b. This initiation of reversal at the strategic position of the area 68b is attributable to the double prestressed condition of the area 68b, and not as a result of geometry of the bulged section 16. Because the grain structure of the metal in the area 68b has been altered as a result of the deflection of that area in one direction, and then deflection of that very same area in an opposite direction, the resulting changes in the grain structure of the metal causes the area 68a to commence reversal before the remainder of the surface area of the bulged section 16. The more reliable reversal and full opening of the bulged section 16 along the line-of-weakness recess 24 is obtained by the stressing of the metal in two directions in the area 68a.

The support ring 14 is affixed to flange 18 of bulged rupture disc 12 using suitable fasteners with the projections 34 underlying score line 24 and supporting the bulged section 16. Tongue 36 is substantially aligned with the hinge area 42 of bulged section 16, and the tang 17 of rupture disc 12.

The rupture disc assembly 10 is adapted to be mounted between flanged couplings of the type illustrated in FIGS. 6-9 U.S. Pat. No. 6,318,576 with the convex surface 16a of rupture disc 12 facing toward the process side of the equipment to be protected. Arm 44 on ring 30 provides the installer of the disc assembly 10 with information as to proper orientation of the assembly between the flange couplings during installation to insure that the convex surface 16a of rupture disc 12 faces toward the process side of the equipment. The arm 44 is also a continuing visual indicator that an installed disc in is proper orientation.

In the event an overpressure condition occurs in the process vessel or piping protected by rupture disc assembly 10, which is sufficient to effect reversal of the bulged section 16, bulged section 16 opens along the line-of-weakness recess 24 while being retained by hinge portion 42. The reverse rupture commences at segment 68 defining region 22 because of the more highly stressed, altered grain structure of the segment region 68. Because of the existence of the higher stressed region 22 in bulged section 16, the overpressure exerted on the convex face 16a of bulged section 16 is believed to initiate reversal of bulged section 16 and ultimately to effect opening of bulged section 16 along the length of line-of-weakness recess 24.

It has been unexpectedly discovered that by deflecting a segment of what will become the bulged section 16 of the disc as described in detail above, and then returning that segment to its initial position to present a smooth, uninterrupted convex surface, reversal of the disc is a function of discontinuity of the grain structure in the segment region 68. This is to be contrasted with simply providing a depression in the disc as illustrated and described in U.S. Pat. No. 6,494,074, in which rupture is initiated as the result of altered load geometry and subsequent stress distribution of the modified convex surface.

Example 1

An exemplary disc 12 prepared in accordance with the preferred process of this invention and depicted in FIG. 10 is preferably fabricated from 2 mil 316 stainless steel and has an overall diameter of about 2.5 inches. Pre-bulging of the disc 12 as schematically illustrated in FIG. 6 is accomplished under a pressure of about 50 psig to form a depression 68 in the disc blank 44 as shown in FIG. 6. Final bulging of the disc as schematically shown in FIGS. 9 and 10 is carried out under a pressure of about 200 psig producing a bulged disc in which the height of the dome is about 0.34 inch. The final bulged disc is then subject to heat treatment at a temperature of about 600° F. for 10 minutes to further relieve any residual stresses in the disc. The outer boundary 91 (FIG. 12) of the metal segment region 68 of the bulged section of the disc, which has been subjected to greater stress than the remaining metal of the bulged section 16 has a nominal area of about 0.4 square inch. The segment region 68 in the exemplary disc is spaced from the central axis of bulged section 16 about 0.3 inch. This disc has a nominal burst pressure of about 8 psig.

It has been unexpectedly discovered that by varying the pressure applied to the disc blank 15 in the fixture 46 to effect pre-bulging of the disc against the post 60, the reversal pressure of the final bulged disc, where the area 68 of bulged section 16 has been indented in one direction and then ironed out in the opposite direction, the pressure at which the disc reverses can similarly be varied. By increasing the pre-bulging pressure to deepen the initial indentation in the bulged section of the disc, followed by ironing out of that indentation during final bulging of the disc, it has been found that the rupture disc will reverse at a lower pressure. Accordingly, the range of pressures at which a disc will reverse is broader than a disc having a one direction indentation not subsequently ironed out because of the bidirectional two stage work hardening of the metal as compared with single direction deflection of the material. The effect of dual, opposite direction work hardening of the metal in a single location has been found to provide a significantly wider range of predetermined reversal pressures than is the case where a single direction indentation is provided in the metal. This increased range of predictable reversal pressures is deemed in large measure to be attributable to the effect of additive opposite direction stress hardening of the metal and the concomitant substantial change in grain structure. In the case of a permanent one direction indentation in the metal, reversal of the disc is believed to be primarily dependent on force vector geometry. Thus, by pre-bulging the disc at different pressures to obtain different depths of initial indentations in the bulged section of the disc blank, followed by final bulging of the disc to an extent to iron out the indentation, the reversal pressures of the resulting discs can be empirically established and the results noted for subsequent duplication. These empirical analyses are a function of the type of material used to manufacture the rupture disc, the thickness of that material, and the diameter of the disc.

Preferred Process for Fabricating the Rupture Disc

In the preferred process of forming a line-of-weakness recess in a reverse acting disc, it is preferable that the line of weakness be situated in the bulged section of the disc. The material at the bottom of the recess is therefore in compression during functional operation of the disc in service, rather than being in tension if the line of weakness is located in the flange of the disc outboard of the bulged section. This is particularly important given the fact that reverse acting rupture discs are subjected to repetitive and often substantial variations in in-service pressure.

Referring to FIGS. 14 and 15 of the drawings, a layer 100 of a layer of resist lacquer material is applied to at least the concave bulged section 16 of the rupture disc 12. An exemplary lacquer is Microshield or Microstop lacquer available from the Tolber division of Pyramid Plastics, Inc., Hope, Ark. The lacquer may be sprayed on to at least the concave surface of the bulged section of the rupture disc 12, although the most efficient process involves submersion of the rupture disc 12 in a bath 102 of lacquer contained within a vessel 104.

After removal of the disc 12 from the lacquer bath 102, followed by drying of the coated disc, the coated disc is positioned in a laser 105 to lase a line in the lacquer that represents and duplicates the line-of-weakness recess to be formed in the concave surface of the bulged section of the disc 12. A suitable laser has been found to be the Model Speedy II laser of the Trotec division of Trodat Corporation headquartered in Wells, Austria. The Speedy II is a 65 watt $CO_2$ pulsed laser. The laser is programmed to direct the laser beam 107 onto the lacquer coating 100 on the concave face 16c of the bulged section 16 of the rupture disc 12 and to follow a line 106 corresponding to the configuration of the desired line-of-weakness recess in the final rupture disc. The laser power output is controlled from 4.5 watts to about 13 watts at a laser head speed of about 1.4 in. per second. The power settings depend upon the specific lacquer used and the thickness of the metal being lased. Heat absorption is the primary reason for varying the laser power output. Laser scanning speed is also a variable that must be accounted for when determining laser power settings. The faster the laser head speed, the more laser energy that is required. The slower the laser head speed, the lower the energy setting required. The preferred way to maintain a constant energy delivery is to use the value of the ratio of laser head speed and laser output levels. This value should be within the range of about 3.2 to 9.28. It is preferred that the lased eroded area of the lacquer, which controls the within of the line-of-weakness recess, be maintained within a range of from about 0.002 in. to about 0.10 in., desirably within the range of about 0.010 in. to about 0.080 in. and preferably about 0.006 in. to about 0.008 in.

The ratio of the laser head speed and laser output levels should also be maintained at a value to assure that the laser beam disturbs and/or removes the lacquer contacted by the laser, but does not oxidize the underlying metal. It has been found in this respect that when the laser is operated properly, lacquer material will be removed by the beam while leaving a very thin residuum of the lacquer in overlying protecting relationship to the uppermost surface of the metal substrate. Preferably, at least about 90% but not all of the lacquer is removed by the laser to assure that the metal does not oxidize and is not removed by the laser. The goal of the lasing operation is to at least weaken and disturb, and/or remove the lacquer along the lased line sufficiently to allow for subsequent electropolishing of the underlying metal while avoiding altering the integrity of the rupture disc metal. An enlarged cross-sectional depiction of the lased line 106 formed in the lacquer layer 100 on the rupture disc blank 15 is shown in FIG. 18.

An exemplary lased disc is illustrated in FIG. 17 of the drawings wherein it can be seen that the lased line 106 is of substantially C-shaped configuration and has outwardly directed curvilinear end extremities 26 and 28 that are spaced from one another a distance equal to the preselected hinge width of the bulged section 16 of the disc.

The concave face of the lased disc as shown in FIG. 22 is then subjected to an electropolishing operation to erode a lustrous, mirror-like line-of-weakness recess in the bulged portion of the metallic member adjacent the transition zone between the bulged section 16 and flange 18, and that conforms to the configuration of the lased line 106. The electropolisher equipment preferably consists of an electropolisher vessel, a water rinse container, and a dryer. The electropolisher vessel contains an acidic solution comprising an admixture of orthophosphoric acid and sulfuric acid. A suitable proprietary commercial formulation is available from Molectrics, Inc., Cleveland, Ohio, as POWER KLEEN 500.

The lased disc 12 as shown in FIG. 22 is immersed in the acidic solution 108 contained in vessel 10 and maintained at a temperature of about 130° F. The temperature of the acidic bath is a function of the concentration and constituents of the acidic solution. Cathodes 112 immersed in the acidic solution 108 and the disc 12 serving as an anode 114 are connected to a variable power source.

The acidic solution in the electropolisher in combination with the electrical current applied to the solution efficiently removes metal from the concave face of the bulged section of the rupture disc along a line defined by the lased area of the lacquer coating on the disc. The electropolisher has the unique ability to attack and remove the metal while leaving a lustrous, mirror-like surface. The electropolishing operation forms a generally W-shaped recess 116 in the metal in which the surfaces 118 of the recess define spaced opposed channel portions 120 and 122 separated by a central raised crown portion 124. The channel portions 120 and 122 are of greater depth than the crown portion 124. It is preferred that the maximum depth of the line-of-weakness recess 116 be at least 70%±25% of the cross sectional thickness of the disc material. Desirably the depth of the recess 116 is at least about 70%±10% of the cross sectional thickness of the disc, and preferably is at least about 70%±5% of the thickness of the disc material. In a preferred embodiment, each of the channel portions 120 and 122 of recess 116 are approximately 25% of the overall width of the recess.

After electropolishing of the disc to form an electropolished recess 116, the lacquer is removed with a solvent. A preferred lacquer removal process is to immerse the electropolished disc in a lacquer thinner or other suitable solvent such as N-methyl-2-pyrrolidone, the principle ingredient of "Microstrip C" available from the Tolber division of Pyramid Plastics, Inc. After stripping of the lacquer from the surface of the electropolished rupture disc 12, the parts are hot water rinsed in the rinse vessel of the electropolishing equipment, and then dried in the dryer component of the equipment.

An especially important advantage of the utilization of a laser to form a defined line in the lacquer coating on the disc corresponding to the desired line-of-weakness recess in the disc surface is the ability to program the laser to follow a path of any predetermined, varying configuration. For example, in the preferred exemplary disc of FIGS. 17, 20, 22, and 24, the electropolished recess 116 defining the line of weakness 24 has outwardly turned, semicircular end extremities 26 and 28 on opposite sides of the hinge portion 42. In the case of out-turned curvilinear end extremities 26 and 28 as shown in FIG. 24, upon reversal of the central portion of bulged section 16 of the rupture disc 12, the forces applied to the line of weakness resulting in tearing of one or both of the channel portions 120 and 122 of the recess 116, causes those forces to be directed outwardly at the curved extremities 26 and 28 toward the body 30 of the underlying supporting ring 14 of the assembly 10, thus providing additional resistance to tearing of the hinge portion 42 of the disc that could otherwise result in fragmentation of the central open portion of the bulged section 16 of disc 12.

Alternate line of weakness configurations are illustrated in FIGS. 25-28 and 30. In the embodiment of rupture disc 12a shown in FIG. 25, the end extremities 26a and 28a of the line-of-weakness recess 24a are in-turned toward one another rather than being out-turned as in the embodiment of FIG. 24. The end extremities 26a and 28a are located in essentially the same positions as end extremities 26 and 28.

In the FIG. 26 embodiment of rupture disc 12b, the end extremities 26b and 28b of the line-of-weakness recess 24b are also out-turned as depicted, while the radius of the recess 24b is variable. If desired, the line-of-weakness recess 24b can be configured to provide an outwardly turned peak segment 30b directly opposite the hinge portion 42 of the disc 12. The peak segment 30b of the line-of-weakness recess 24b facilitates opening of the central portion of bulged section 16 upon reversal of the disc 12. Separation of the central portion from the flange 18 of the disc commences at the peak segment 30b because of concentration of bending forces at the apex of the peak segment 30b. The radius of the line-of-weakness recess 24c of the embodiment of disc 12c illustrated in FIG. 27 varies, but in this instance the peak segment 30c opposite the hinge portion 42 of the disc 12 is turned inwardly toward the center of the bulged section 16.

In the embodiment of disc 12d shown in FIG. 28, the end extremities 26d and 28d of line-of-weakness recess 24d are in the form of circles spaced from one another and positioned on opposite sides of the hinge portion 42 of the disc 12. The provision of the circular end extremities 26d and 28d at opposite ends of the line-of-weakness recess 24d serve to direct and diffuse the tearing forces imposed on the line-of-weakness recess 24d. The circular end extremities 26d and 28d direct and diffuse the bending forces at opposed ends of the line of weakness, thus contributing to tear resistance of the hinge portion 42 of the central portion of the bulged section 16 of disc 12. This diffusion of tearing forces at end extremities 26d and 28d of line-of-weakness recess 24d impedes fragmentation of the central portion of the bulged section 16 during opening thereof.

In FIG. 29, the disc 12e is of the same construction as disc 12 as shown in FIG. 24, but in this instance, a distinctive image such as a manufacturer's or customer's logo 130 can be formed in the surface of the disc by electropolishing at the same time the recess 116 is formed in the electropolishing equipment. In lieu of a logo or the like, the electropolished image formed in the bulged section 16 of the disc 12 may be a unique identifying number or model designation.

In the alternative embodiment of FIG. 30, the disc 12 has circular cavities 26f and 28f at the opposite extremities of the line-of-weakness recess 24f in the rupture disc 12f. As is evident from the cross-sectional depiction in FIG. 31, the individual cavities 26f and 28f have a central raised area 30f. The cavities 26f and 28f also serve to direct and diffuse the tearing forces imposed on the line-of-weakness recess 24f, thus contributing to the tear resistance of the hinge portion 42f of the central portion of the bulged section 16f of disc 12f to tear that would result in fragmentation of the central portion of the bulged section 16 on opening thereof.

The utilization of a laser for forming the line of weakness representation allows the fabricator of the disc 12 to provide any one of an infinite variety of electropolished representations in the lacquer coating on the disc 12, which is then transferred to the surface of the disc during electropolishing of the line-of-weakness recess.

The graphical representations in FIG. 35 depict test results that demonstrate the provision of the electropolished line-of-weakness recess 116 in the bulged section 16 of the disc 12 does not change or affect the pressure required to effect reversal of the central portion of the bulged section 16 of the disc 12. This is important for a number of reasons.

An unscored reverse acting rupture disc of a particular material, thickness, and diameter, having a central portion bulged to a predetermined height will reverse at a particular pressure, but the reversed portion of the disc does not open unless it is provided with a line of weakness defining the area of the disc which opens. However, where the disc is scored, either in the bulged section or in the flange area, the disc reverses and opens at a different pressure than an unscored disc because of work hardening of the scored area by the score die, and creation of stress forces in the disc adjacent the score line while the hinge area is not similarly stressed. As a consequence of disc scoring, the pressure required to effect reversal of the bulged section of the disc as compared with an unscored disc is unpredictable based on factors including among other things the degree of work hardening by the die, the depth of the score line, the condition of the die as a result of constant use, variable die scoring set up conditions including the pressure exerted on the die during scoring, tilting of the die during scoring causing unequal score depth along its length, inherent differences in the metallurgy of the sheet material throughout its extent, and the variety of the metals necessary for fabrication of discs that meet particular specified conditions and customer requirements.

Example 2

In the graphical representation of FIG. 35, the results of pressure tests conducted on eight two-inch diameter stainless steel discs each 0.002 in. thick are plotted on the basis of burst/reversal pressure on the Y axis and percent of pre-bulge pressure on the X axis. Four of the discs had an electropolished recess while the other four discs did not have an electropolished recess and therefore the surface was smooth. The discs were all made using a final bulge pressure of 200 psi as set forth in Example 1. The percentages of pre-bulge pressure on the X axis of the graph in FIG. 35 are expressed as a percentage of the 200 psi final bulge pressure.

These pressure tests demonstrated that samples without an electropolished recess, when pre-bulged at pressures ranging from 10% to 25%, reversed within a range of 10 psi to 50 psi, depending upon the pre-bulge pressure. Unexpectedly, the samples having electropolished recess reversed and burst at essentially the same pressures as the discs without an electropolished recess, in each instance dependent upon the extent of pre-bulging.

As is evident from the graph, variation of the percent of pre-bulge pressure and extent of pre-bulging changes the burst/reversal pressure of the discs, and confirms that a range of burst/reversal pressures can be obtained by simply varying the percentage of pre-bulge pressure as compared with final bulge pressure.

The present process of manufacturing reverse acting rupture discs using a laser to lase a defined line of weakness in a lacquer coating on the disc surface followed by formation of an electropolished line of weakness recess, has been found to overcome many of the heretofore unresolved problems inherent in efforts to etch a line of weakness in corrosion-resistant materials such as stainless steel and the like. Not only is an inordinate amount of time necessary to obtain a recess of required depth in corrosion-resistant materials, but in addition, the resulting etched surface is rough and therefore more susceptible to corrosion failure at the very point where the rupture disc is at its weakest. Furthermore, it is difficult to control the fabrication process in a production environment, particularly where the etchant solution and the etching conditions are constantly undergoing change, and a different acidic agent must be used for each particular metal undergoing the etching process.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

What is claimed is:

1. A method of preparing a metallic pressure relief device comprising the steps of:
    applying a barrier layer of resist material on at least a portion of one of the opposed faces of the relief device;
    lasing a predetermined area of the barrier layer of resist material on said one face of the relief device to remove a portion of the resist material corresponding to the predetermined area and leave a residuum of the resist material to protect the portion of said one face of the relief device corresponding to the lased predetermined area;
    removing metal from the relief device corresponding to said lased predetermined area of the resist material; and
    controlling the depth of removal of metal from the relief device such that not all of the metal is removed corresponding to said lased predetermined area of the resist material.

2. A method of preparing a metallic pressure relief device as set forth in claim 1 wherein is included the step of subjecting the predetermined area of the pressure relief device to electropolishing to form a line-of-weakness recess of predetermined depth in said one face of the relief device.

3. A method of preparing a metallic pressure relief device as set forth in claim 2 wherein is included the step of controlling the electropolishing to form a line-of-weakness recess defined by spaced opposed channel portions separated by a central raised crown portion, said channel portions being of greater depth than said crown portion.

4. A method of preparing a metallic pressure relief device as set forth in claim 1 wherein is included the step of lasing the resist material on said one face of the relief device along a predetermined line, said step of removing metal from the relief device along said predetermined line being controlled to form a line-of-weakness recess of predetermined depth in said one face of the relief device.

5. A method of preparing a metallic pressure relief device as set forth in claim 1 wherein is included the step of bulging a portion of the relief device prior to application of the resist material to said one face of the relief device.

6. A method of preparing a metallic pressure relief device as set forth in claim 5 wherein said bulged portion of the relief device has a convex face and a concave face, and including the steps of applying said resist material to at least the concave face of the bulged portion of the relief device, and lasing the predetermined area of said resist material on said concave face of the bulged portion of the relief device.

7. A method of preparing a metallic pressure relief device as set forth in claim 1 wherein is included the step of removing metal from the relief device corresponding to said predetermined area of the resist material by electropolishing.

8. A method of preparing a metallic pressure relief device as set forth in claim 1 wherein is included the steps of lasing the layer of resist material along a predetermined line, and controlling the width of the material removed from said pressure relief device by controlling the width of the lased line of resist material.

9. A method of preparing a metallic pressure relief device as set forth in claim 1 wherein metal is removed from the relief device by subjecting the predetermined area of the pressure relief device to electropolishing to form a recess in the relief device of predetermined depth.

10. A method of preparing a metallic pressure relief device as set forth in claim 1 wherein is included the step of lasing the resist material along a predetermined line corresponding to a desired line of weakness in the relief device.

11. A method of preparing a metallic pressure relief device as set forth in claim 10 wherein is included the step of lasing the resist material along a generally C-shaped line corresponding to the desired line of weakness in the relief device.

12. A method of preparing a metallic pressure relief device as set forth in claim 11 wherein is included the step of lasing the resist material along a line having a generally inverted U-shaped peak intermediate the ends of the line that extend away from the circular length of the line.

13. A method of preparing a metallic pressure relief device as set forth in claim 11 wherein is included the step of lasing the resist material along arcuate C-shaped curved extensions at opposite extremities of the C-shaped line that extend away from the circular length of the line.

14. A method of preparing a metallic pressure relief device as set forth in claim 11 wherein is included the step of lasing the resist material along closed arcuate extensions at opposite extremities of the C-shaped line that extend away from the circular length of the line.

\* \* \* \* \*